United States Patent
Lim et al.

(10) Patent No.: US 9,679,180 B2
(45) Date of Patent: Jun. 13, 2017

(54) PORTABLE DATA CAPTURE DEVICE

(71) Applicant: SYMBOL TECHNOLOGIES, INC., Lincolnshire, IL (US)

(72) Inventors: Sunghun Lim, Bethpage, NY (US); Ian R Jenkins, Stonybrook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 14/580,634

(22) Filed: Dec. 23, 2014

(65) Prior Publication Data

US 2016/0180132 A1 Jun. 23, 2016

(51) Int. Cl.
*G06K 7/10* (2006.01)

(52) U.S. Cl.
CPC ..... *G06K 7/10891* (2013.01); *G06K 7/10544* (2013.01)

(58) Field of Classification Search
USPC ............ 235/462.45, 462.42, 462.41, 462.01, 235/462.09
See application file for complete search history.

(56) References Cited

U.S. PATENT DOCUMENTS

| | | | |
|---|---|---|---|
| 4,411,016 A | 10/1983 | Wakeland | |
| 4,509,129 A | 4/1985 | Yatsunami et al. | |
| 4,538,072 A | 8/1985 | Immler et al. | |
| 5,034,598 A | 7/1991 | Poland | |
| 5,229,590 A | 7/1993 | Harden et al. | |
| 5,408,535 A | 4/1995 | Howard, III et al. | |
| 5,640,002 A | 6/1997 | Ruppert et al. | |
| 5,880,451 A | 3/1999 | Smith et al. | |
| 6,179,208 B1 * | 1/2001 | Feng ................. | G06K 7/10732 235/462.24 |
| 7,325,737 B2 | 2/2008 | Epshteyn et al. | |
| 7,726,575 B2 | 6/2010 | Wang et al. | |
| 8,028,920 B2 | 10/2011 | Barkan | |
| 8,056,808 B2 | 11/2011 | Epshteyn | |
| 8,096,475 B2 | 1/2012 | Perera et al. | |
| 8,113,432 B2 | 2/2012 | Kimura et al. | |
| 8,120,696 B2 | 2/2012 | Jerdev | |
| 8,179,563 B2 | 5/2012 | King et al. | |
| 8,469,275 B2 | 6/2013 | Dahari | |
| 8,532,346 B2 | 9/2013 | Thorn | |

(Continued)

FOREIGN PATENT DOCUMENTS

EP 1413971 A1 4/2004

OTHER PUBLICATIONS

International Search Report and Written Opinion for corresponding International Patent Application No. PCT/US2015/061527 mailed on Feb. 24, 2016.

(Continued)

*Primary Examiner* — Ahshik Kim (57) ABSTRACT

A portable data capture device and method for using the same are provided. The portable capture device includes a data capture module, a processor and a sensory indicator component. The data capture module captures data from a data bearing element. The processor determines that that the data has been successfully captured, subsequently processes the data to extract at least one characteristic thereof, and determines an indicator associated with the at least one characteristic. The sensory indicator component presents the indicator.

21 Claims, 8 Drawing Sheets

(56) References Cited

U.S. PATENT DOCUMENTS

| | | |
|---|---|---|
| 8,596,541 B2 | 12/2013 | Chiu et al. |
| 9,113,235 B2 | 8/2015 | Choi et al. |
| 2001/0045460 A1 | 11/2001 | Reynolds et al. |
| 2002/0030094 A1 | 3/2002 | Curry et al. |
| 2002/0073092 A1 | 6/2002 | Nally et al. |
| 2004/0195320 A1 | 10/2004 | Ramsager |
| 2005/0203846 A1 | 9/2005 | Noguchi |
| 2006/0098245 A1 | 5/2006 | Park |
| 2007/0194125 A1 | 8/2007 | Murofushi et al. |
| 2008/0128499 A1 | 6/2008 | Chen et al. |
| 2009/0001173 A1 | 1/2009 | Sevier et al. |
| 2009/0045261 A1* | 2/2009 | Pine .................. G06K 7/10732 235/462.42 |
| 2009/0078774 A1 | 3/2009 | He |
| 2009/0108071 A1* | 4/2009 | Carlson ............. G06K 7/10811 235/462.32 |
| 2009/0152358 A1 | 6/2009 | Epshteyn et al. |
| 2010/0037184 A1 | 2/2010 | Sie |
| 2010/0157280 A1 | 6/2010 | Kusevic et al. |
| 2011/0068172 A1 | 3/2011 | Liu |
| 2011/0169917 A1 | 7/2011 | Stephen et al. |
| 2011/0259963 A1 | 10/2011 | McCall et al. |
| 2011/0290889 A1 | 12/2011 | Tamburrini et al. |
| 2012/0211563 A1 | 8/2012 | Gannon et al. |
| 2012/0284091 A1 | 11/2012 | Colavito |
| 2013/0063620 A1 | 3/2013 | Kim et al. |
| 2013/0087618 A1 | 4/2013 | Zhu et al. |
| 2013/0121546 A1 | 5/2013 | Guissin |
| 2013/0201392 A1 | 8/2013 | Gutierrez |
| 2013/0341401 A1 | 12/2013 | Kannan et al. |
| 2014/0089121 A1 | 3/2014 | Kaminsky et al. |
| 2014/0138441 A1 | 5/2014 | Davalos et al. |

OTHER PUBLICATIONS

International Search Report and Written Opinion in International Patent Application No. PCT/US2013/068682 mailed on Jul. 4, 2014.

* cited by examiner

PORTABLE DATA CAPTURE DEVICE

BACKGROUND OF THE INVENTION

Portable data capture devices for capturing data from data bearing elements are known. Data bearing elements can be, for example, barcodes, MICR print, radio frequency identification ("RFID") tags, etc.

Barcodes are a common type of data bearing element. They are often printed on labels and affixed to packages to indicate information about the packages in shipping applications. A barcode is an optical machine-readable representation of data relating to an object to which it is attached or on which it resides. Older barcode types are linear or one-dimensional, representing data by varying the widths and spacings of parallel lines. Later-developed barcodes are typically two-dimensional, representing data via rectangles, dots, hexagons, and other geometric patterns. Barcodes can include indicia to assist with delineation of the data elements in the barcodes.

Data capture devices for barcodes are referred to commonly as barcode scanners, in some scenarios are portable and may be handheld. Such barcode scanners include optical scanning componentry to optically read the data contained in the barcode. The optical scanning componentry can include, for example, a laser emitter, a collimator, a light condensing lens, and a linear light receiver. Scanning light beams emitted from the laser emitter are projected onto a barcode through the collimator. The reflected image of the light beams are focused onto the linear light receiver through the light condensing lens and converted into digital data by some type of signal processor. The digital data is then processed to decode data contained by the barcode.

For package processing applications, such as the sorting of packages in a shipping facility/hub, the data captured by barcode scanners may be transmitted to a separate computer having a display. A routing selection can then be presented on the display. The routing selection can be associated with packing order on a vehicle, selection of a conveyor belt at the facility, placement on a certain vehicle for delivery, etc. This solution is associated with a relatively high human error rate when an operator is reading the information on the display and acting on it.

In an alternative approach, the computing device may print a separate routing label to be affixed to a package, the label providing a visual indication of the routing selection for the package. These routing labels can be costly. Further, where a routing selection is determined for a package multiple times during delivery, further routing labels are generated and affixed to the package multiple times and an earlier routing label may be acted on if not properly covered by a subsequent routing label, leading to package routing errors.

Accordingly, there is a need for a new portable data capture device.

BRIEF DESCRIPTION OF THE SEPARATE VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A portable data capture device and method for using the same is provided. The portable data capture device has a data capture module for capturing data from a data bearing element. A processor of the portable data capture device determines that that the data has been successfully captured, and subsequently processes the data to extract at least one characteristic. An indicator associated with the at least one characteristic is then determined. A sensory indicator component of the portable data capture device presents the indicator.

Figure 1:
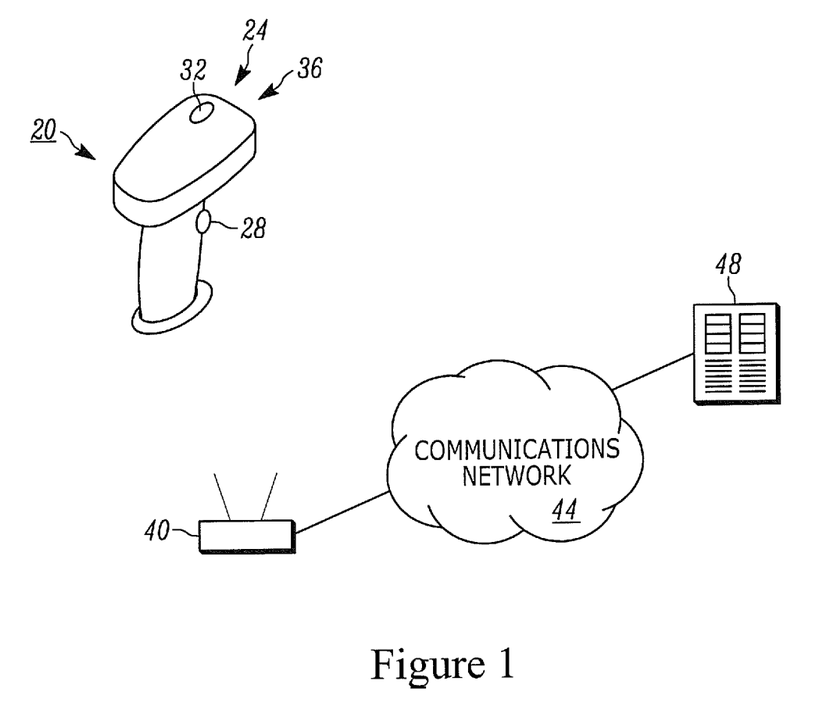
FIG. 1 is a high-level architecture diagram of a handheld barcode scanner and its operating environment in accordance with an embodiment.

FIG. 1 is a high-level architecture diagram of a portable data capture device and its operating environment in accordance with an embodiment. The portable data capture device, in this embodiment, is a handheld barcode scanner 20 that captures data from barcodes. The handheld barcode scanner 20 is used in a shipping facility to scan barcodes printed on labels that are affixed to packages as the packages are handled, pass by a station, etc. The handheld barcode scanner 20 has a data capture module, in particular optical scanning componentry 24 that operates to scan a barcode. In particular, the optical scanning componentry 24 includes a laser emitter, a collimator, a light condensing lens, and a linear light receiver. Scanning light beams emitted from the laser emitter are projected onto a barcode through the collimator. The light beams generated by the laser emitter are red in color. The reflected image of the light beams are focused onto the linear light receiver through the light condensing lens and converted into digital data by some type of signal processor. The digital data is then processed to decode data contained by the barcode. The optical scanning componentry can include alignment guide lights to assist an operator with visually aligning the handheld barcode scanner 20 with a barcode.

A trigger 28 on the handheld barcode scanner 20 activates the optical scanning componentry 24 to capture data from a barcode. Upon activation of the trigger 28, the optical scanning componentry 24 commences emitting laser light at a barcode towards which it is oriented, and capturing the reflected light to generate digital data.

A confirmation indicator light 32 indicates when a scan of a barcode has been successfully completed.

The handheld barcode scanner 20 further includes sensory indicator component, namely an indicator light array 36 for projecting a visual indicator onto the barcode. The indicator light array 36 can generate and project lights of discrete colors, either through the illumination of a single discretely colored light element or the illumination of two or more colored light elements to produce other colors.

The handheld barcode scanner 20 is in communication with a wireless access point 40 for transmitting package data extracted from the barcodes printed on shipping labels affixed to packages. A barcode used in a shipping application can include, for example, shipper information, recipient information including a delivery address including a zip or postal code, shipment information such as a shipment ID, hub routing information, a service code, loading dock ID, etc. The package data is communicated through a communications network 44 to a package tracking server 48 that tracks packages as they move through a shipping network.

Figure 2:
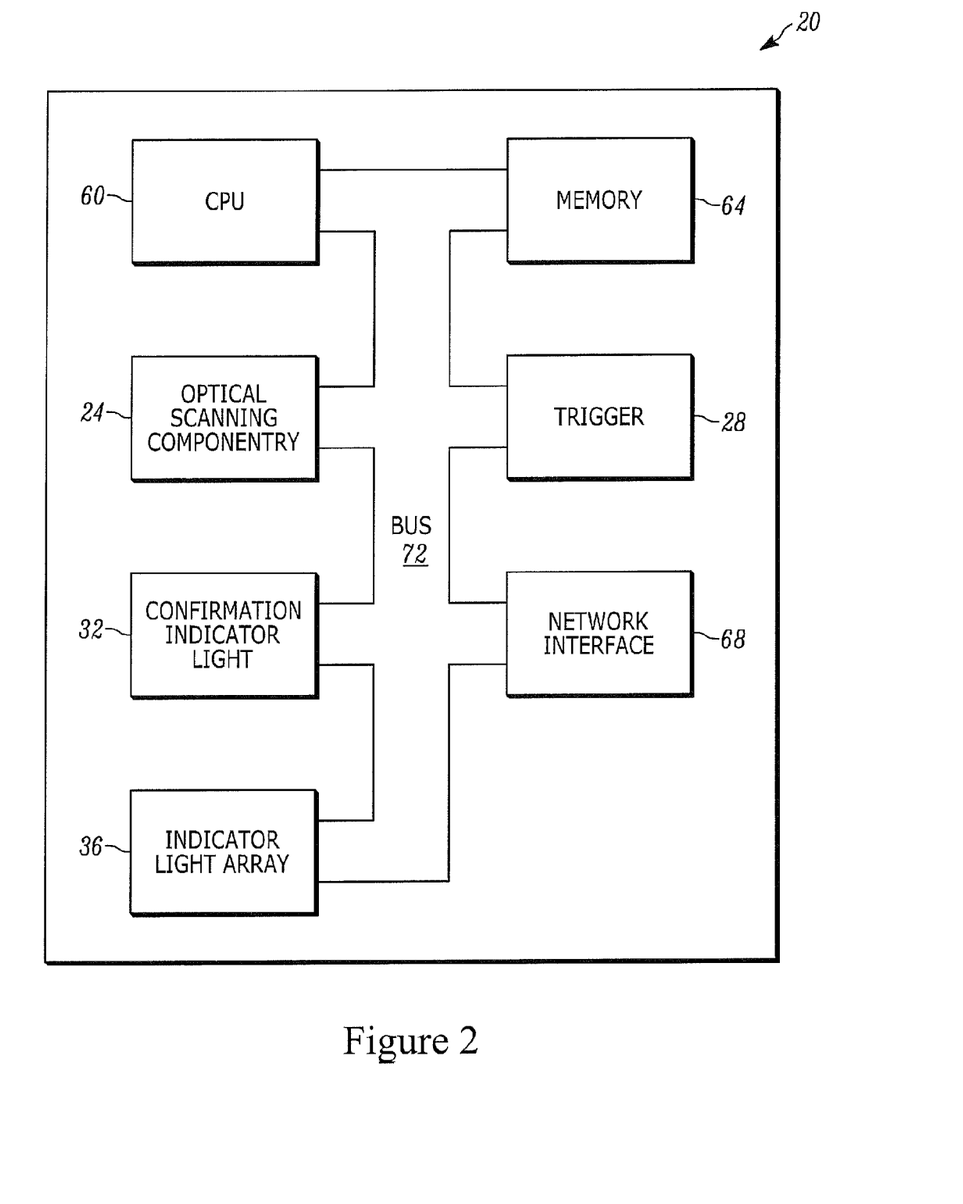
FIG. 2 is a block diagram of various components of the handheld barcode scanner of FIG. 1.

FIG. 2 is a block diagram of various components of the handheld barcode scanner 20. In addition to the optical scanning componentry 24, the trigger 28, the confirmation indicator light 32, and the indicator light array 36, the handheld barcode scanner 20 has a number of other physical and logical components, including a central processing unit ("CPU") 60, a memory 64, a network interface 68, and a local bus 72 enabling the CPU 60 to communicate with the other components.

The CPU 60 executes an operating system and a data capture and processing program. The memory 64 stores computer-executable instructions for the operating system and the data capture and processing program, as well as a table of mappings between zip codes and routing selection indicators used by the data capture and processing program. The network interface 68 permits communication with other computing devices, such as the package tracking server 48. In particular, the network interface 68 communicates via WiFi with the wireless access point 40 which is in communication with the package tracking server 48.

Figure 3:
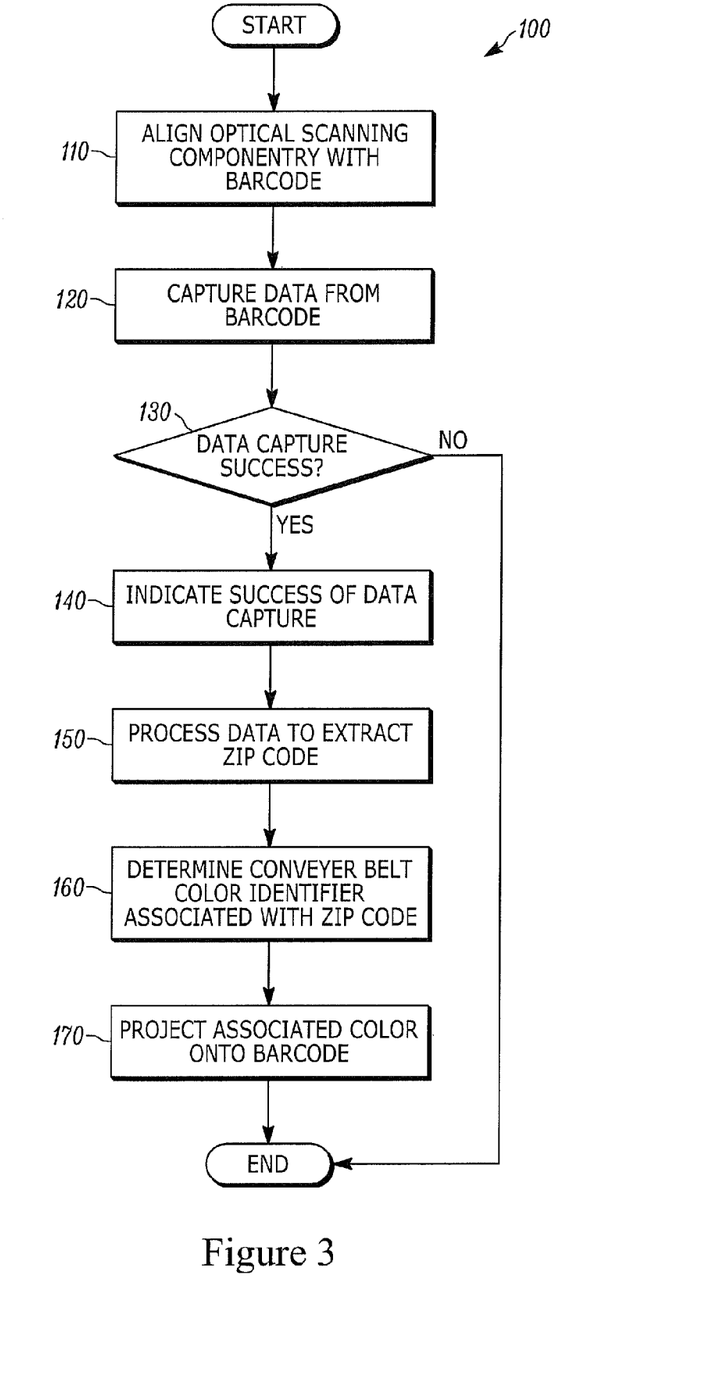
FIG. 3 is a flowchart of a general method of using the handheld barcode scanner of FIG. 1.

Now referring to FIG. 3, a method of using the handheld barcode scanner 20 is shown generally at 100.

The method 100 begins with an operator orienting the handheld barcode scanner 20 so that the optical scanning componentry 24 is aligned with a barcode to be scanned (110). The operator orients the handheld barcode scanner 20 by orienting it so that the optical scanning componentry 24 is proximal to and directed at the barcode to be scanned.

The optical scanning componentry 24 can include alignment guide lights to assist the operator with visually aligning the optical scanning componentry 24 of the handheld barcode scanner 20 with a barcode. The alignment guide lights may be provided with the same light source(s) used to scan the barcode or may be separate from those light sources, and may be triggered by depressing the trigger 28 lightly. The data capture and processing program can receive notification of the slight depression of the trigger 28 and, in response, can direct the handheld barcode scanner 20 to project alignment guide lights.

Once the operator deems the optical scanning componentry 24 of the handheld barcode scanner 20 to be aligned with the barcode to be scanned, data is captured from the barcode (120). In particular, the operator squeezes the trigger 28 to cause the optical scanning componentry 24 to scan. The data capture and processing program receives notification of the trigger 28 being activated and directs the optical scanning componentry 28 to commence data capture. The optical scanning componentry 28 emits a laser at the barcode and registers signals corresponding to the light reflected back.

Figure 4:
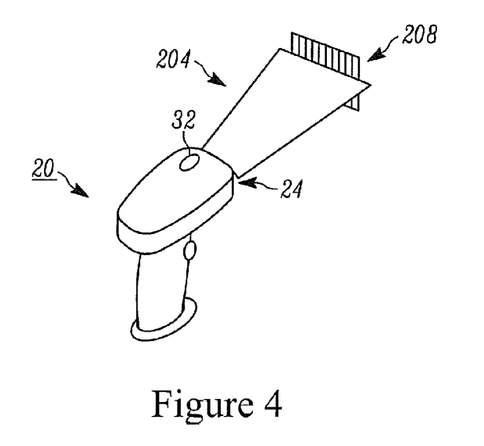
FIG. 4 shows the handheld barcode scanner of FIG. 1 capturing data from a barcode.

FIG. 4 illustrates the handheld barcode scanner 20 capturing data using laser light 204 from a barcode 208. As shown, the optical scanning componentry 24 is aligned with the barcode, a linear barcode in this example, so that the barcode data can be captured.

Returning again to FIG. 3, the handheld barcode scanner 20 then determines if the data capture was a success (130). If the handheld barcode scanner 20 is generally aligned with the barcode, and if the barcode is of sufficient quality, the optical scanning componentry 24 is likely able to receive and register signals corresponding to reflected laser light projected onto the barcode and process the signals according to the type of barcode being scanned to decode data contained by the barcode.

Specifications for barcode types stipulate what form elements each barcode of that specific type must contain. For example, some linear barcode types always include indicia to assist with delineation of the barcode, have a set number of data bars between the indicia, and the last data bar in the barcode provides an error checking value to allow for confirmation of the other values of the barcode when decoded. The handheld barcode scanner 20 uses the specification for the barcode type being scanned as well as the error checking information to determine if the data capture is a success.

If the data capture is determined to be a failure at 130, then the method 100 ends. If, instead, the data capture is determined to be a success at 130, then the success of the data capture is indicated (140). Upon determining that data was captured successfully from the barcode, the confirmation indicator light 32 is illuminated for a set period of time, such as two seconds. By providing a visual cue of the success or failure of a data capture from a barcode, an operator of the handheld barcode scanner 20 can readily understand if the data encoded therein has been read or if the barcode needs to be scanned again to ensure that the data encoded therein is captured.

Figure 5:
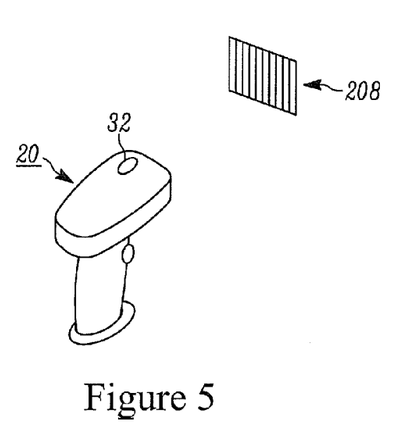
FIG. 5 shows the handheld barcode scanner of FIG. 1 after determining the success of the capture of the barcode as shown in FIG. 4.

FIG. 5 illustrates the handheld barcode scanner 20 indicating that the data capture was successful by illumination of the confirmation indicator light 32.

Returning again to FIG. 3, the data captured successfully from the barcode is then processed to extract a zip code (150). The decoded data is parsed to identify values in data item fields. For example, a barcode used in a shipping application can include shipper information, recipient information including a delivery address, shipment information such as a shipment ID, etc. The data capture and processing program is provisioned with a specification for the data encoded in the barcode so that it can parse out values from the data decoded from the barcode.

Upon extracting the zip code from the data decoded from the barcode, a conveyor belt color identifier associated with the zip code is determined (160). The handheld barcode scanner 20 includes a mappings table that is referenced by the data capture and processing program. The mappings table includes mappings between zip codes and conveyor belt color identifiers. Each conveyor belt color identifier identifies the color of a conveyor belt that represents a different routing selection for packages to be shipped. The differently colored conveyor belts carry packages to different locations in a shipping facility for differentiated handling. For example, for a shipping facility in Chicago, Ill., zip codes for Gary, Ind. may be mapped to a first conveyor belt color identifier corresponding to the color of a first conveyor belt that transports packages to loading docks for loading onto delivery vehicles that deliver packages in the local area, and zip codes for Washington, D.C. may be mapped to a second conveyor belt color identifier corresponding to the color of a second conveyor belt that transports packages to a loading dock where packages are loaded into trailers and transported to an airport through which packages destined for Washington are routed.

As will be appreciated, the mappings table can be generated for a shipping facility, a station in the shipping facility, etc. Additionally, the mappings table may include other criteria for selecting a route for the package, such as time of day or day of the week. Further, the mappings table may directly or indirectly specify ranges of zip codes that map to certain conveyor belt color identifiers. Revisions to the mappings table can be provided to the handheld barcode scanner 20 via the network interface 68.

After determination of the conveyor belt color identifier, the handheld barcode scanner 20 projects an associated color onto the barcode (170). The data capture and processing program directs the indicator light array 36 to produce a color associated with the conveyor belt color identifier that is associated with the zip code extracted from the bar code. The data capture and processing program executing on the handheld barcode scanner 20 is configured to cause the indicator light array 36 directed at the barcode to project light of the associated color for four seconds. As the operator is looking at the barcode to align the optical scanning componentry 24 with the barcode, it can be advantageous to project the associated color directly onto the barcode at which the operator is generally looking to convey in a readily understandable manner how the package should be handled.

Figure 6:
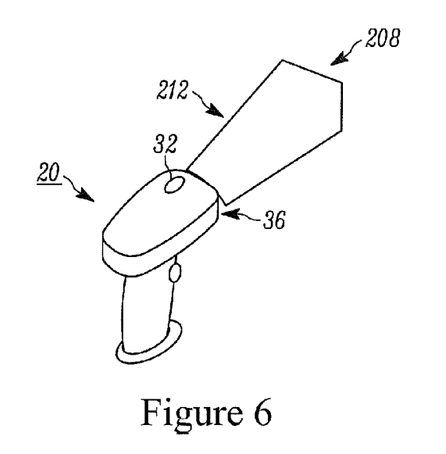
FIG. 6 shows the handheld barcode scanner of FIG. 1 projecting an indicator light onto the barcode after indicating success of the data capture from the barcode as shown in FIG. 5.

FIG. 6 illustrates the handheld barcode scanner 20 of FIGS. 4 and 5 projecting a colored light 212 associated with a conveyor belt color identifier onto the barcode 208. The colored light 212 is projected onto the barcode 208 for four seconds.

Returning again to FIG. 3, upon projected the associated color onto the barcode, the method 100 is complete.

Figure 7:
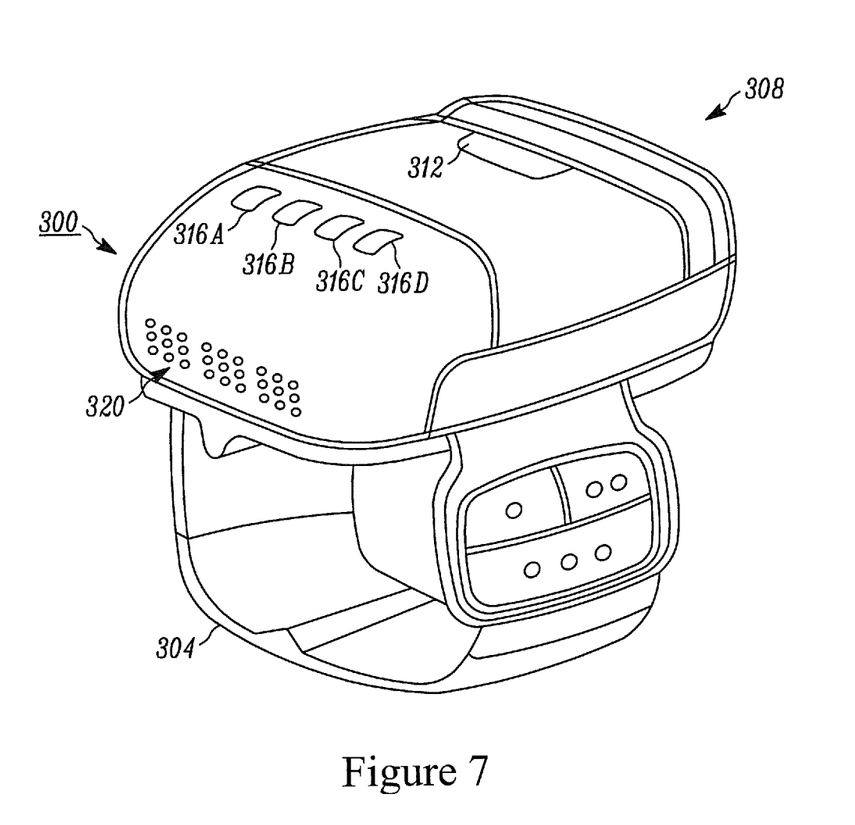
FIG. 7 is a perspective view of a barcode scanner ring in accordance with an alternative embodiment.

FIG. 7 illustrates a portable barcode scanner in accordance with another embodiment. The portable barcode scanner, in this case, is a barcode scanner ring 300. The barcode scanner ring 300 includes a strap 304 for securing the barcode scanner ring 300 to a finger of an operator. Optical scanning componentry 308 operates to capture data from barcodes, much in the same manner as optical scanning componentry 24 does. A confirmation indicator light 312 indicates when a scan of a barcode has been successfully completed. The barcode scanner ring 300 further has an indicator light array that includes a green indicator light 316A, a red indicator light 316B, a blue indicator light 316C, and a yellow indicator light 316D. A speaker 320 can provide audio feedback.

Figure 8:
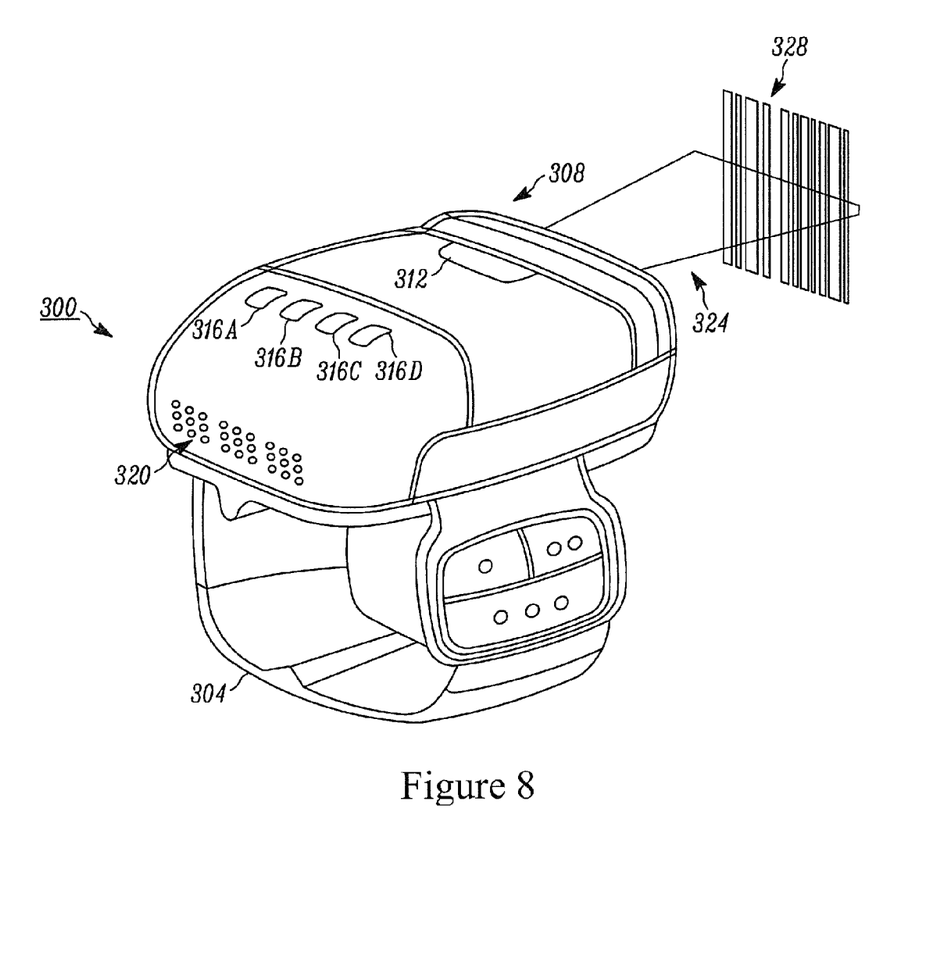
FIG. 8 shows the barcode scanner ring of FIG. 7 capturing data from a barcode.

FIG. 8 illustrates the barcode scanner ring 300 capturing data using laser light 324 projected onto a barcode 328 by the optical scanning componentry 308.

Figure 9:
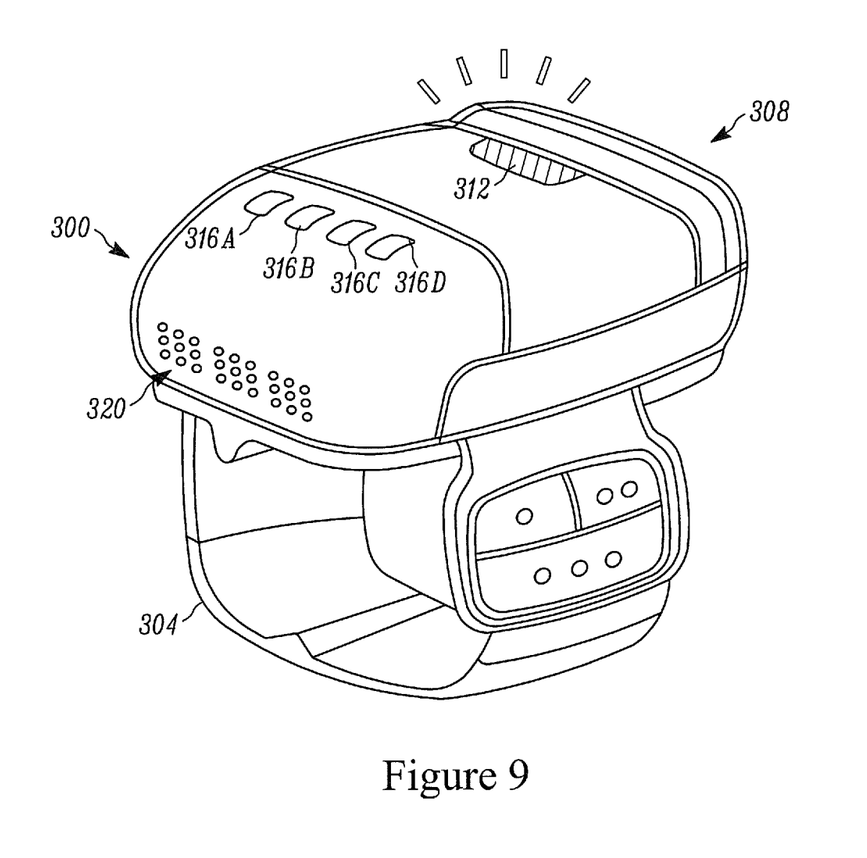
FIG. 9 shows the barcode scanner ring of FIG. 8 after determining the success of the capture of the barcode.

FIG. 9 shows the barcode scanner ring 300 after successfully capturing data from a barcode 328. The confirmation indicator light 312 is illuminated to indicate that the scan of the barcode 328 was successful.

Figure 10:
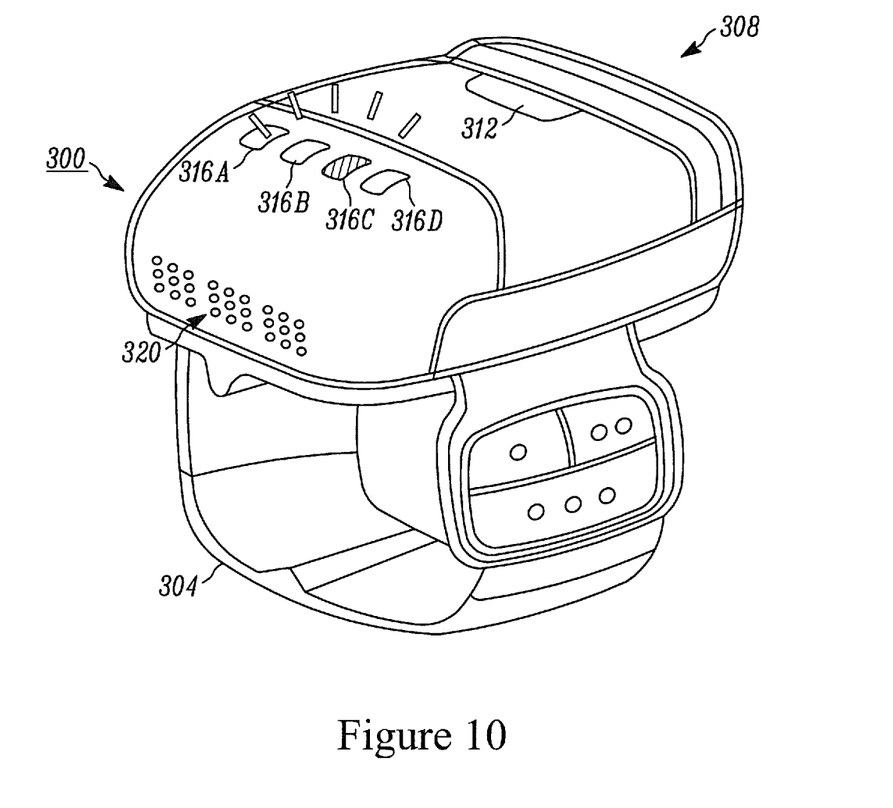
FIG. 10 shows the barcode scanner ring of FIG. 9 with one of the indicator lights illuminated to provide a routing selection associated with data decoded from the barcode.

FIG. 10 shows the barcode scanner ring 300 of FIG. 9 illuminating the blue indicator light 316C in the indicator light array. Upon decoding the data captured from the barcode 328 and processing it to extract a zip code and determine a conveyor belt color indicator to which the zip code is mapped, software executed by the barcode scanner ring 300 powers the blue indicator light 316C in the indicator light array.

In operation, the barcode scanner ring 300 is visually oriented with a barcode to be scanned. The indicator lights 316 therefore are within the operator's line of sight and visually present information derived from the data decoded from the barcode in a manner that facilitates understanding of a next task to be performed and reduces human error in understanding the derived information.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

While the above-described embodiments relate to the capture of data from barcodes, those skilled in the art will appreciate that other types of portable data capture devices can be employed. The portable data capture device may take form of, but is not limited to, handheld devices such as a smart phone, a barcode scanner, optical code reader and the like.

The data bearing element can be a barcode, an RFID tag, MICR print, or some other type of encoded data read with a portable data capture device.

The data capture module can include one or more data sensors for capturing data from various data sources. A data sensor may be an optical sensor such as a charge-coupled device (CCD) sensor, a laser scanner and the like, that may capture data from optical data sources such as bar codes, quick response (QR) codes and video response (VR) codes and other similar optical data sources. Data sensors may also include electromagnetic sensors such as near field communication (NFC) sensors and radio frequency identification (RFID) readers that may capture data from electromagnetic data sources such as from RFID tags and NFC tags and the like. The data capture module may also include additional components to aid with its operation such as lasers for scanning optical data, optics for directing light to image sensors and antennae for aiding data reception by electromagnetic readers. To capture optical data, the optics of the data capture module may be pointed at the data source, such as a bar code, at an appropriate distance. To capture RFID or NFC data, antennae associated with the RFID reader or NFC sensor are brought within a prescribed range of the item containing the RFID or NFC tag. In accordance with some embodiments, the portable data capture device may include multiple data capture modules, each module including one or more data sensors.

The sensory indicator component can project a visual indicator onto a surface having the data bearing element. For example, where the portable data capture device reads data from RFID tags, an operator can target the object containing the RFID tag and the portable data capture device can, upon successfully decoding data from the RFID tag, project a visual indicator onto the viewed surface of the object. In such cases, the sensory indicator component can be any suitable illumination source, such as a set of one or more LEDs.

While the indicators described above are colored lights displayed for a set period of time, other types of indicators can be presented by the sensory indicator component. For example, where the indicator is projected, it can be a pattern of lights varied by time, color, shape/symbol, pattern of display, text, etc. or any combination thereof. Further, an indicator may also be projected in the vicinity of the data bearing element, such as, for example, above a barcode.

An indicator can include a visual cue in other scenarios via the sensory indicator component, it can be any visual cue, such as one or more solid colors, a spatial and/or temporal pattern of color or colors, illuminated symbols, etc.

Indicators can also include an audio component, such as a beep, chime, ringtone, etc. Still further, indicators can also include haptic feedback via a vibration motor.

At least some of the function of the sensory indicator component can be provided by the data capture module in some cases. For example, with CCD-based barcode scanners, the LEDs used to illuminate a barcode can be used to present an indicator.

Further, at least some of the function of the sensory indicator component can be provided by the alignment guide lights in some cases.

The at least one characteristic extracted from the data bearing element can include location data such as a zip code, a state, a proximate city, or a next shipping facility, date data such as a date of birth or a date of expiry, or a unique identifier identifying a data record stored remotely from the portable data capture device. For example, a portable data capture device could be used to scan a data bearing element on an identification card to determine if a person wishing to enter a liquor-licensed establishment. The data bearing element can include the cardholder's date of birth, and the portable data capture device can determine if the cardholder's age calculated based on the date of birth satisfies an age requirement. Upon making the determination, the sensory indicator component can be used to indicate that the cardholder either meets the age requirement with a light of a first color, such as green, or does not meet the age requirement with a light of a second color, such as red, thus reducing human error and speeding up age requirement checking.

The mappings in the memory of the portable data capture device can be updated via the network interface to accommodate for changes in routing options.

Instead of storing mappings between characteristics and indicators in memory, the portable data capture device can include a communications interface communicating at least one characteristic to a computing device, and receiving, from the computing device, a determination of the indicator associated with the at least one characteristic.

Two or more characteristics can be extracted from the data decoded from a barcode to determine an indicator. For example, routing options may vary depending on the type of object being shipped. If a package contains hazardous materials, it may not be permitted to be shipped via airplane and may have to instead be shipped via land routes. Thus, a first characteristic for the location of the shipping destination can be combined with a second characteristic identifying the contents of the package as hazardous or non-hazardous materials.

Instead of determining the indicator via a mappings table, the indicator can be determined from the at least one characteristic in other manners. For example, an indicator can be calculated based on the characteristics, or can be a mapping of a calculated value based on the characteristics.

The network interface of the portable data capture device may be configured for at least one of wired and wireless communications. For example, the network interface can be configured for communications utilizing any wireless radio frequency channel, for example, a one or two-way messaging channel, a mobile cellular telephone channel, or a mobile radio channel. Similarly, it will be appreciated that the network interface of the portable data capture device can be configured utilizing other types of communication channels such as Institute of Electrical and Electronics Engineers (IEEE) 802.11, IEEE 802.16 and/or Bluetooth channels. Further, it will be appreciated that the network interface may be configured for wireline communication channel such as a local area network (LAN) or a wide area network (WAN) or a combination of both. The LAN, for example, may employ any one of a number of networking protocols, such as TCP/IP (Transmission Control Protocol/Internet Protocol), AppleTalk™, IPX/SPX (Inter-Packet Exchange/Sequential Packet Exchange), Net BIOS (Network Basic Input Output System) or any other packet structures to enable the communication among the devices and/or chargers. The WAN, for example, may use a physical network media such as X.25, Frame Relay, ISDN, Modem dial-up or other media to connect devices or other local area networks.

The memory 140 may be an IC (integrated circuit) memory chip containing any form of RAM (random-access memory) or ROM (read-only memory), a CD-RW (compact disk with read write), a hard disk drive, a DVD-RW (digital versatile disc with read write), a flash memory card, external subscriber identity module (SIM) card or any other non-transitory medium for storing digital information. The memory 140 comprises one or more applications 180, a data gathering application 185 and one or more patterns 190 corresponding to one or more known gestures. The applications 180 include various software and/or firmware programs necessary for the operation of the 100 as well as software and/or firmware programs (e.g. banking, email applications etc.) that address specific requirements of the user.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable data capture device, comprising:
a data capture module configured to capture data from a data bearing element;
a processor configured to determine that the data has been successfully captured, subsequently process the data to extract at least one content characteristic of the captured data, and determine a content indicator associated with the at least one content characteristic of the captured data; and
a sensory indicator component configured to present the content indicator that corresponds to a routing selection with respect to an item.

2. The portable data capture device of claim 1, wherein the portable data capture device is a barcode scanner.

3. The portable data capture device of claim 1, wherein the sensory indicator component is configured to project the content indicator as a visual indicator onto a surface upon which the data bearing element resides.

4. The portable data capture device of claim 3, wherein the portable data capture device is a barcode scanner, and the sensory indicator component is configured to project the visual indicator onto the data bearing element when the barcode scanner is oriented to capture data from the data bearing element.

5. The portable data capture device of claim 4, wherein the data capture module comprises the sensory indicator component.

6. The portable data capture device of claim 5, wherein the data capture module is configured to project a first light of a first color onto the data bearing element, wherein the content indicator comprises a second light of a second color selected from a set of colors and projected by at least one light-emitting element, the second color associated with the at least one content characteristic of the captured data.

7. The portable data capture device of claim 1, wherein the sensory indicator component comprises at least one light-emitting element.

8. The portable data capture device of claim 7, wherein the at least one light-emitting element is incorporated into the portable data capture device so that the at least one light-emitting element is visible while holding the portable data capture device when oriented to capture data from the data bearing element.

9. The portable data capture device of claim 1, further comprising:
a memory storing mappings between a set of content characteristics and a set of content indicators.

10. The portable data capture device of claim 1, further comprising:
a communications interface for communicating the at least one content characteristic to a computing device, and receiving, from the computing device, a determination of the content indicator associated with the at least one content characteristic.

11. The portable data capture device of claim 1, wherein the at least one content characteristic comprises location data and the routing selection is based on the location data.

12. A method of presenting an indicator for captured data, comprising:
capturing data, via a data capture module of a portable data capture device, from a data bearing element;
determining, via a processor of the portable data capture device, that the data has been successfully captured;
subsequently processing, via the processor, the data to extract at least one content characteristic of the captured data;
determining a content indicator associated with the at least one content characteristic of the captured data and corresponding to a routing selection with respect to an item; and
presenting the content indicator via a sensory indicator component.

13. The method of claim 12, wherein the portable data capture device is a barcode scanner.

14. The method of claim 12, wherein the presenting comprises:

projecting, via the sensory indicator component, the content indicator as an optical indicator onto a surface upon which the data bearing element resides.

15. The method of claim 14, wherein the portable data capture device is a barcode scanner, and wherein presenting comprises:
projecting, via the sensory indicator component, the optical indicator onto the data bearing element when the barcode scanner is oriented to capture data from the data bearing element.

16. The method of claim 15, wherein the data capture module comprises the sensory indicator component.

17. The method of claim 15, wherein the capturing comprises:
projecting, via the data capture module, a first light of a first color onto the data bearing element;
and wherein the presenting comprises:
projecting, via a light-emitting element, a second light of a second color selected from a set of colors, the second color associated with the at least one content characteristic.

18. The method of claim 12, wherein the sensory indicator component comprises at least one light-emitting element incorporated into the portable data capture device so that the at least one light-emitting element is visible while holding the portable data capture device oriented to capture data from the data bearing element.

19. The method of claim 12, wherein the determining of the content indicator comprises:
accessing mappings, stored in a memory of the portable data capture device, between a set of content characteristics and a set of content indicators.

20. The method of claim 13, further comprising:
communicating, via a communications interface of the portable data capture device, the at least one content characteristic to a computing device; and
receiving, via the communications interface from the computing device, a determination of the content indicator associated with the at least one content characteristic.

21. The method of claim 12, wherein the at least one content characteristic comprises location data and the routing selection is based on the location data.

* * * * *